Patented Feb. 14, 1939

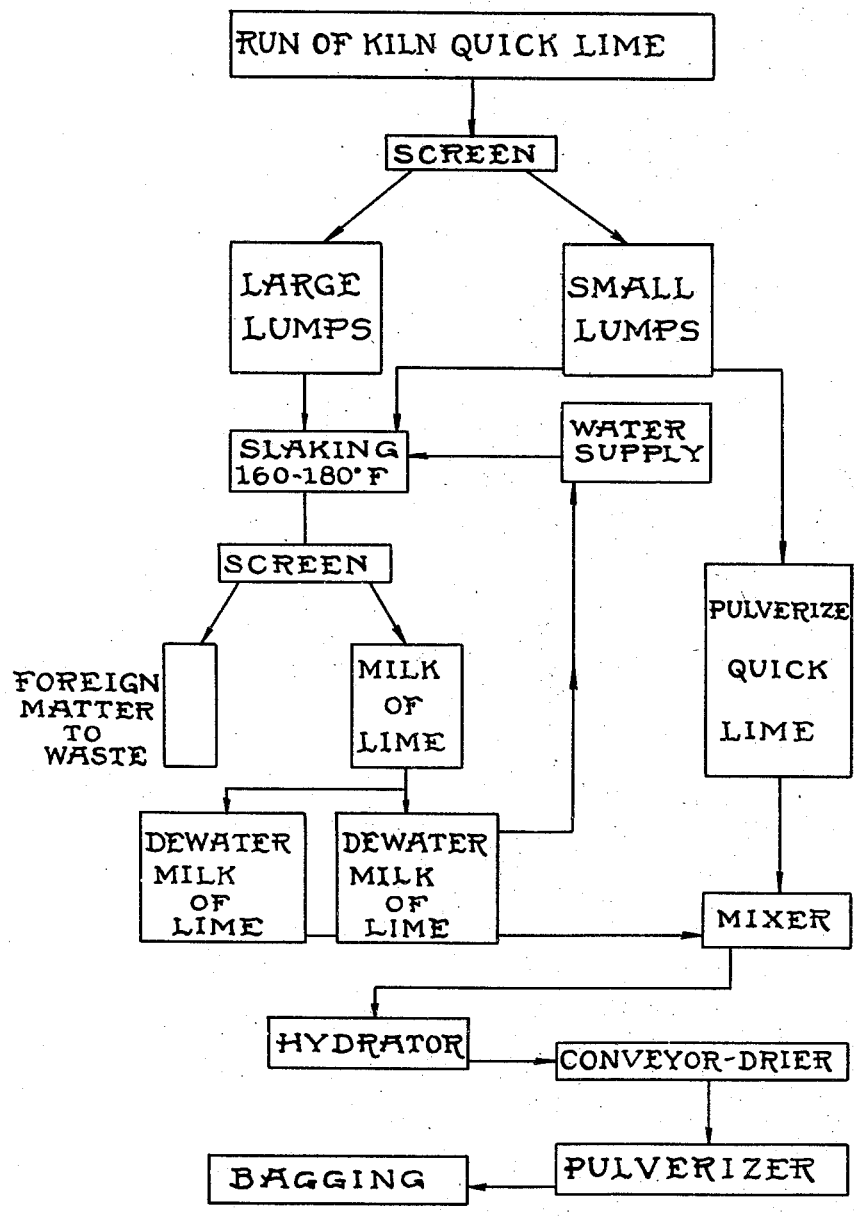

2,147,191

UNITED STATES PATENT OFFICE 2,147,191

MAKING PLASTIC LIME

William E. Carson, Riverton, Va.

Application July 7, 1936, Serial No. 89,415

4 Claims. (Cl. 23—188)

This invention relates to making plastic lime; and it comprises a method of making dry powdered hydrated lime quickly forming a buttery plastic mass with water wherein lime is slaked with sufficient water and for a sufficient time to produce a buttery gel or sludge and this gel is mingled with finely ground dry quicklime in amount sufficient to take up gel water, the mixture being then dried and powdered; all as more fully hereinafter set forth and as claimed.

There is a considerable market for dry hydrated lime, a lime which has been slaked with a little water to form a dry commercial product which can be bagged and handled conveniently. Any lump lime if slaked in a mortar box with plenty of water will give a buttery gelled lime hydrate which does not roll under the trowel. This is the old fashioned way of slaking lime for use as mortar, in finishing compositions, etc. Some of the commercial dry hydrates when made up with water form the same buttery compositions but not many. And those which do, ordinarily require treatment with water for 24 hours or so. All the other dry hydrated limes on the market give more or less granular mealy or grainy compositions when mixed with water; they do not give the kind of plastic buttery mass that can be readily attained in the mortar box. This is a recognized defect of commercial hydrated limes.

In the present invention I obviate the stated difficulties and produce a dry hydrated lime which, on admixture with water, gives a good gel or paste like that produced with lump lime slaked with an excess of water in the mortar box. To this end I slake lime under conditions analogous to those in the mortar box: using plenty of water to hold the temperature down well below the boiling point and plenty of time to insure every particle of the lime becoming completely hydrated and gelled, giving particles of colloidal fineness. Experience has shown that a paste or cream of lime of this character cannot be directly dried by heat, by air or in other ways to give a dried product which is reversible; which on admixture with water will give the original buttery or plastic composition. But I have found that by the expedient of mixing very finely ground dry lime with the cream of lime sludge produced as described, the fine lime hydrates at the expense of the water in the sludge and a dry or nearly dry product results. Remaining moisture can be removed from the product in the ordinary ways and the final powdered product on admixture with water gives a buttery plastic mass. In this respect the result is the same as with the exceptional commercial dry hydrates mentioned but there is still a difference in that the new dry hydrated lime forms a plastic gel at once, whereas the prior art limes, even the best of them, require 24 hours contact with water as a minimum.

In the accompanying illustration, I show a diagrammatical flow sheet of the process. The lump quicklime as it comes from the kiln and after cooling is passed through a sizing screen dividing the lumps into large and small sizes. The large lumps and a portion of the small lumps are run into a slaker where they are treated with sufficient water to completely slake the lumps and give a slurry or milk of lime. The amount of water used in slaking is sufficient to hold the temperature during the slaking well below the boiling point of water. I have found that a temperature of slaking between 160 and 180° F. gives the best results. From the slaker the milk of lime is run through a shaking screen where foreign matter, such as hard lumps of unburned lime may be separated and run to waste. The milk of lime is run into storage tanks. In the storage tanks the milk of lime settles into a thick gel-like sludge with overlying water and the free water is run back to a water supply tank to be used over. A plurality of the dewatering tanks is best provided so that the milk of lime can be subjected to storage and aging actions which improve the plastic qualities of the lime. A portion of the small lumps of quicklime coming through the screen is run into a pulverizing mill, and is there ground to a fine powder, 100 mesh or finer. From the mill the powdered quicklime is run to storage. A mixer is fed with the settled milk of lime sludge and with the powdered quicklime in proportions such that the quicklime is hydrated by the water of the sludge. After mixing, the mixture is run into a hydrator, such as a Crane hydrator, where it is held for a time sufficient for the hydrating action to proceed and for the mixture to become substantially dry. From the hydrator the dry mixture is run onto a belt conveyor of sufficient length to cool and further dry the hydrated lime. The belt conveyor delivers into a pulverizer bin from which it goes through a pulverizing mill. The pulverizer may deliver into a bagging machine where the hydrated lime is packed in bags ready for market.

In the process, it is important to keep the slaking or hydrating temperature down to 180° F. or lower, both in the slaking of the lump lime and in the slaking of the powdered quicklime by the water of the milk of lime sludge. As stated, the product is a dry hydrated lime which quickly forms with water a buttery plastic mass and which is advantageous in use either for making mortar for brick laying or for finishing plaster.

The hydrator shown for the second hydrating step is a convenience and gives a better product provided the temperature is kept down below 180° F. but it may be dispensed with, the mixture being delivered directly on the surface of the belt conveyor. In so doing the belt should be long, move slowly and the mixture be supplied as a thin layer to give ample opportunity for cooling and time for hydration. Some drying takes place.

In making the milk of lime sludge it is advantageous to keep the water content low. Heat generated in the hydration of the ground lime is absorbed by the lime hydrate of the sludge; the less water in the sludge, the less ground lime required and the less the heat generated in hydration.

What I claim is:—

1. A process of making plastic powdered hydrated lime which comprises slaking quicklime in lumps as it comes from the kiln in an excess of water, sufficient to hold the temperature below 180° F. and forming milk of lime containing lime of colloidal fineness, mixing with this milk of lime sufficient powdered quicklime to take up by slaking most of the water of the milk and to give a substantially dry mixture, keeping the mixture below 180° F. during the slaking and drying and grinding the mixture.

2. A process of slaking quicklime which comprises dividing lump quicklime into two portions, slaking one portion in an excess of water sufficient to hold the temperature at 160° to 180° F. to form a sludge containing lime hydrate of colloidal fineness, fine grinding the other portion of quicklime and mixing the two portions in proportions forming a dry mixture, the temperature of hydration being held around 180° F.

3. A process of making dry lime hydrate which comprises slaking quicklime with sufficient water to hold the temperature during slaking at approximately 180° F. and to form a milk of lime gel containing free water, dewatering said milk and then mixing powdered quicklime therewith, maintaining the temperature of the mixture at approximately 180° F. during the ensuing slaking action and grinding the dry hydrate.

4. In the manufacture of dry lime hydrate by slaking burnt lime with an excess of water and taking up the excess water by an addition of burnt lime, an improved process which comprises slaking one portion of burnt lime with an excess of water sufficient to hold the temperature during slaking at 180° F. or below, thereby forming a colloidal milk of lime, removing excess water from said milk, thereafter mixing the dewatered milk with powdered burnt lime in proportions to take up the remaining water of the milk by slaking, and keeping the temperature during the slaking at 180° F. or below.

WILLIAM E. CARSON.